United States Patent [19]

Begou

[11] 4,071,493

[45] Jan. 31, 1978

[54] PRODUCTS WITH A FLUIDIFYING ACTION FOR MINERAL PASTES AND BINDERS

[75] Inventor: Patrick Begou, Moirans, France

[73] Assignee: Societe Chimique des Charbonnages, Paris, France

[21] Appl. No.: 756,407

[22] Filed: Jan. 3, 1977

[30] Foreign Application Priority Data

Jan. 2, 1976    France .................................. 76 00027

[51] Int. Cl.$^2$ ...................... C04B 7/02; C04B 33/13; C08K 3/00
[52] U.S. Cl. .................................. 260/42.13; 106/71; 106/90; 106/111; 106/119; 260/29.6 PS; 260/29.6 S; 260/79.5 NV; 526/280
[58] Field of Search ............... 260/79.5 NV, 29.6 S, 260/29.6 PS, 42.13; 526/280, 30, 41; 106/89, 90, 100, 102

[56] References Cited

U.S. PATENT DOCUMENTS

| 1,299,798 | 4/1919  | Skinner ............................. 260/42.13 |
| 1,299,847 | 4/1919  | McCoy .............................. 260/42.13 |
| 2,695,850 | 11/1954 | Lorenz ................................. 106/76 |
| 2,835,655 | 5/1958  | Bauman et al. ............. 260/79.5 NV |
| 3,135,029 | 6/1964  | Cooper et al. .................. 260/29.6 S |
| 3,140,269 | 7/1964  | Wahl et al. ................. 260/79.5 NV |
| 3,234,154 | 2/1966  | Martin ............................. 260/29.6 S |
| 3,753,963 | 8/1973  | Hayashi ................................ 526/280 |
| 3,799,913 | 3/1974  | Wheeler et al. ...................... 526/280 |

*Primary Examiner*—Ronald W. Griffin

[57] ABSTRACT

Alkali metal salts of sulphonated styrene-indene hydrocarbon resins are useful fluidifying agents for mineral pastes and binders such as concrete.

2 Claims, No Drawings

PRODUCTS WITH A FLUIDIFYING ACTION FOR MINERAL PASTES AND BINDERS

The present invention relates to fluidifying agents useful in the manufacture of fluid concretes which position themselves without mechanical intervention.

To obtain easily workable mineral pastes it is often necessary to use excessive quantities of water: for the mineral binders this excess leads to a reduction in the mechanical performance, especially in the case of mixtures made from cement, lime, hydraulic lime, plaster or anhydrite. For pastes of clay or other mineral mixtures intended to be fired, the excess of water requires a not inconsiderable expenditure of energy.

It is therefore of the greatest interest to make fluid mineral pastes using a product having a good fluidifying power in order to avoid the use of too great a quantity of mixing water.

This problem is resolved, according to the present invention, by incorporating into mineral pastes and binders, during mixing, or when putting the concrete (or other paste or binder) into place, from 0.01 to 5% by weight, relative to the said pastes or binders, of at least one alkali metal salt of a sulphonated styrene-indene hydrocarbon resin.

The alkali metal salts of styrene-indene resins which can be used are prepared by polymerisation of an aromatic petroleum fraction, derived from vapour cracking, using a Friedel-Krafts catalyst, so as to give a resin having a KS softening point between 60° and 150° C and a low degree of polymerisation, followed by sulphonation of the styrene-indene hydrocarbon resin in solution to produce a product having a content of unsulphonated material of less than about 10%, and neutralisation with an alkali.

The styrene-indene hydrocarbon resins are prepared from styrene (or an alkyl derivative of styrene) and indene (or an alkyl derivative of indene); they can include in their molecular chains radicals resulting from a copolymerisation of other monomers; they are obtained by polymerisation of aromatic petroleum fractions derived from vapour cracking, the boiling point of the fraction being between approximately 120° and 250° C, using a Friedel-Crafts type catalyst.

The styrene-indene hydrocarbon resins which are used are characterised in particular by their KS (Kramer-Sarnow) softening point which can vary from approximately 60° to approximately 150° C. It is preferred to use resins having the highest softening temperatures (140° C for example). These resins have a low degree of polymerisation, for example less than 50.

The initial styrene-indene hydrocarbon resins are then sulphonated and the sulphonated product is converted into an alkali metal salt. The sulphonation can be carried out by any known means, but in such a way that the proportion of "non-sulphonated" resin remaining after the sulphonation is less than approximately 10% by weight. However, the sulphonation must not be taken too far since part of the sulphonating agent could remain in the uncombined state in the treated resin and subsequently be converted to an undesirable alkali metal salt present in the final product.

The conversion of the sulphonated resin into the corresponding alkali metal salt presents no problems; for example a caustic alkali solution can be used to neutralise the sulphonated resin.

The present invention also provides a process for the preparation of the alkali metal salt of the sulphonated resin. This process comprises sulphonating the styrene-indene hydrocarbon resin in an inert solvent for the said resin using a sulphonating agent such as concentrated sulphuric acid, oleum or chlorosulphonic acid. Among the sulphonating agents which can be used the most advantageous is chlorosulphonic acid which allows a low proportion (4 to 7%) of unsulphonated material to be obtained, and which subsequently allows an easy decantation of the sodium sulphonate from the reaction medium.

The sulphonated product obtained is then neutralised with a caustic alkali solution to obtain the corresponding alkali metal salt. The salt obtained being water-soluble, it is possible first, to obtain, by decantation, the alkali metal salt of the sulphonated styrene-indene hydrocarbon resin in aqueous solution and, secondly, to recover the solvent. By "inert solvent" is meant a compound (or mixture of compounds) which is a solvent for the styrene-indene hydrocarbon resins used, but which is not attacked by the sulphonating agent used under the conditions in which the sulphonation reaction is effected. Suitable inert solvents include carbon tetrachloride, tetrachloroethane, dichloroethane and nitrobenzene. It is carbon tetrachloride which permits the best results to be obtained, both during the reaction itself and during the operation of decantation of the sulphonate from the solvent; moreover, using carbon tetrachloride, the % of chloride ions in the final product remains low.

The alkali metal salts of the sulphonated resins used may be used either in the dry state or in aqueous solution. Although the use of these salts often allows the presence of air bubbles in building materials to be avoided, particularly when the said salts are derived from a styrene-indene hydrocarbon resin whose melting point is approximately 140° C, products having anti-foam properties can be added to the fluidifier according to the invention. Unsulphonated styrene-indene hydrocarbon resins themselves have anti-foam properties.

The following Examples illustrate the invention. These Examples were carried out using styrene-indene hydrocarbon resins with the tradename NORSOLENE SP. The figure (SP 70, SP 110 and SP 140) indicates the KS softening point of the said "NORSOLENE" resins.

EXAMPLE 1

100 g. of Norsolene SP 110 are dissolved in 200 g of carbon tetrachloride. 200 g of 100% sulphuric acid are then added in 1 hour, and the reaction is continued for 5 to 6 hours at 60° – 65° C. The mixture is neutralised with 700 g of 23% sodium hydroxide solution. The aqueous phase is recovered after decantation.

In order to test the fluidising power of the product thus obtained the following experiment is carried out:

On a concrete of composition:

| | |
|---|---|
| Gravel 10/20 | 34.200 kg |
| Gravel 4/10 | 18.300 kg |
| Sand 1/4 | 12.500 kg |
| Sand 0.1 | 25.000 kg |
| Cement CPA 325 | 17.000 kg |
| Water | 8.250 l |

The slump test is carried out according to Standard Specification AFNOR NF P 18,451. On the concrete described above, the slump is 5 cm. The addition to an otherwise identical concrete of 1.5% of the solution obtained above allows a very liquid concrete to be obtained for which the slump test gives more than 20 cm.

EXAMPLE 2

200 g. of Norsolene SP 70 are dissolved in 400 g of carbon tetrachloride. 180 g of chlorosulphonic acid are poured slowly into this solution. The temperature is maintained at 40° C for the 2 hours required for the addition and is then brought to 60° C for 1 hour. 700 g of 9% sodium hydroxide solution are then added. After decantation, the aqueous phase containing 30% of the sodium salt of the sulphonated styrene-indene hydrocarbon resins is recovered.

This solution is tested on the concrete described in Example 1, at the rate of 0.8% based on the weight of cement. The slump test gives more than 20 cm.

EXAMPLE 3

1,000 g of Norsolene SP 110 resin are dissolved in 4,000 g of carbon tetrachloride and 1,000 g of chlorosulphonic acid are run in over 3 hours at 40° C. The temperature is then brought to approximately 65° C and maintained there for 3 hours. After slight cooling, the mixture is neutralised with 3,300 g of 13% sodium hydroxide solution. Decantation allows, 4,800 g of a 40% aqueous solution of sodium styrene-indene resin-sulphonate to be obtained, to which 1% of anti-foam is added.

The product thus obtained is tested on the concrete described in Example 1.

A. The standard concrete, with 8.250 liters of mixing water, gives 5 cm for the slump test and its compressive strength, after 7 days, is 272 bars.

B. The same concrete, with 8.250 liters of mixing water, but with the addition of 0.4% based on the cement of the final product obtained according to Example 3, gives more than 20 cm for the slump test and its compressive strength, after 7 days, is 278 bars.

C. The same concrete, but made with 6.700 liters of mixing water and 1% based on the weight of cement of the final product obtained according to Example 3, gives 6 cm for the slump test and its compressive strength, after 7 days, is 360 bars.

EXAMPLE 4

The comparative results obtained are assembled in the Tables which follow.

a. With several alkali metal salts according to the invention, differing from one another essentially in their starting styrene-indene resins which are respectively resins having a softening point (Kramer-Sarnow) of 70° C (SP 70), 110° C (SP 110) and 140° C (SP 140). The salt (called "fluidifier") has been added at the rate of 1% by weight relative to a CPAZ-325 cement from "Ciments Francais," the ratio of water to cement (W/C) being equal to 0.55.

TABLE I

| Starting NORSO-LENE | % fluidifier | OCCLUDED AIR, in % | |
|---|---|---|---|
| | | without anti-foam | with anti-foam |
| SP 70 | 1 | >8 | 4.2 |
| SP 110 | 1 | 7 | 4.3 |
| SP 140 | 1 | 4.5 | |
| SP 140 | 0.4 | 3 | |

The results assembled in this Table show that the most condensed resin (SP 140) leads to a COPLA concrete being obtained, having a very low proportion of occluded air, even in the absence of additional anti-foam.

b. With a sodium salt of the sulphonate of the SP 140 resin, the action of which (as the fluidifying agent used with a CPA 400 cement from "Ciments Francais"), in the manufacture of the AFNOR mortar has been compared with that of a "commercial fluidifier B" which is the product CH 13 from Messrs. Rhône-Progil, the results are:

TABLE II

| % of the fluidifier of the invention | Water Cement | Flow time | Compressive strength in bars | |
|---|---|---|---|---|
| | | | after 24 hours | after 7 days |
| 0 (standard) | 0.50 | 8 seconds | 50 | 209 |
| 0.5 | 0.50 | <<8 seconds | 83 | 287 |
| 0.5 | 0.40 | 8 seconds | 110 | 427 |
| % of commercial fluidifier (B) | | | | |
| 1% | 0.50 | <<8 seconds | 49 | 210 |
| 1% | 0.40 | <8 seconds | 72 | 270 |

The results assembled in this Table show the very clear increase in compressive strength obtained by using a product according to the invention.

1. A mineral paste or binder with increased fluidity said increased fluidity accomplished by inclusion of an alkali metal salt of a sulphonated styrene-indene hydrocarbon resin said resin prepared by polymerisation of an aromatic petroleum fraction, derived from vapor cracking, using a Friedel-Krafts catalyst, so as to yield a resin having a KS softening point between 60° and 150° C and a low degree of polymerisation, followed by sulphonation of the styrene-indene hydrocarbon resin in solution to produce a product having a content of unsulphonated material of less than 10%, with subsequent neutralization with an alkali.

2. A paste or binder according to claim 1 in which said alkali metal salt is used at the rate of 0.01 to 5% by weight based upon the weight of the mineral paste or mineral binder.

* * * * *